US010391611B2

(12) United States Patent
Bilke et al.

(10) Patent No.: US 10,391,611 B2
(45) Date of Patent: Aug. 27, 2019

(54) DEVICE AND METHOD FOR CUTTING A GOOD TO BE CUT BY MEANS OF A FLUID

(71) Applicants: Uhde High Pressure Technologies GmbH, Hagen (DE); thyssenkrupp AG, Essen (DE)

(72) Inventors: Volker Bilke, Bochum (DE); Andrzej Karpinski, Hagen (DE); Thomas Opfermann, Dortmund (DE); Holger Werth, Unna (DE); Günther Elsigan, Schlüsslberg (AT)

(73) Assignees: UHDE HIGH PRESSURE TECHNOLOGIES GMBH, Hagen (DE); THYSSENKRUPP AG, Essen (DE)

( * ) Notice: Subject to any disclaimer, the term of this patent is extended or adjusted under 35 U.S.C. 154(b) by 217 days.

(21) Appl. No.: 15/554,531

(22) PCT Filed: Jan. 22, 2016

(86) PCT No.: PCT/EP2016/051351
§ 371 (c)(1),
(2) Date: Aug. 30, 2017

(87) PCT Pub. No.: WO2016/150588
PCT Pub. Date: Sep. 29, 2016

(65) Prior Publication Data
US 2018/0071893 A1 Mar. 15, 2018

(30) Foreign Application Priority Data
Mar. 20, 2015 (DE) ........................ 10 2015 104 245

(51) Int. Cl.
*B64C 7/00* (2006.01)
*B24C 5/02* (2006.01)
(Continued)

(52) U.S. Cl.
CPC ................ *B24C 1/045* (2013.01); *B24C 5/02* (2013.01); *B24C 5/04* (2013.01); *B24C 7/00* (2013.01);
(Continued)

(58) Field of Classification Search
CPC .. B24C 1/045; B24C 5/02; B24C 5/05; B24C 7/00; B24C 7/0015; B24C 7/0023; B26F 3/004
(Continued)

(56) References Cited

U.S. PATENT DOCUMENTS 2,985,050 A * 5/1961 Schwacha ............... B26F 3/004 125/23.01
3,212,378 A * 10/1965 Rice ........................ B26F 3/004 134/17
(Continued)

FOREIGN PATENT DOCUMENTS

CN 203460064 U 3/2014
CN 104421048 A 3/2015
(Continued)

OTHER PUBLICATIONS

English translation of International Search Report issued in PCT/EP2016/051351, dated Apr. 13, 2016 (dated Apr. 26, 2016).
(Continued)

*Primary Examiner* — Eileen P Morgan
(74) *Attorney, Agent, or Firm* — thyssenkrupp North America, Inc.

(57) ABSTRACT

A device for cutting a cuttable material with the aid of a fluid, in particular for water-jet cutting, may include a pressure-generating unit and an outlet nozzle that is fluidically connected to the pressure-generating unit via a fluid line. The pressure-generating unit may pressurize the fluid in the fluid line. The device may further comprise a pulsation
(Continued)

damper for damping pressure fluctuations in the fluid line. The device may also include at least one switching valve such that, depending on a switching position of the switching valve, the pulsation damper is couplable to the fluid line and uncouplable from the fluid line.

17 Claims, 2 Drawing Sheets

(51) Int. Cl.
*B24C 1/04* (2006.01)
*B24C 7/00* (2006.01)
*B26F 3/00* (2006.01)
*B24C 5/04* (2006.01)

(52) U.S. Cl.
CPC .......... *B24C 7/0007* (2013.01); *B24C 7/0023* (2013.01); *B26F 3/004* (2013.01)

(58) Field of Classification Search
USPC .......................................................... 451/40
See application file for complete search history.

(56) References Cited

U.S. PATENT DOCUMENTS 3,520,477 A * 7/1970 Cooley .................. B05B 12/06 239/101
3,521,820 A * 7/1970 Cooley .................. B05B 12/06 239/101
3,526,162 A * 9/1970 Willcox ................ B23P 25/003 426/518
5,169,065 A * 12/1992 Bloch .................. B05B 1/3402 239/11
5,700,181 A * 12/1997 Hashish .................... B24C 1/06 451/40
2002/0056347 A1* 5/2002 Signey .................... B26F 3/004 83/53
2007/0063066 A1* 3/2007 Vijay ...................... B26F 3/004 239/99
2015/0059701 A1 3/2015 Song

FOREIGN PATENT DOCUMENTS

DE 19652298 A 6/1998
DE 19758159 A 8/1998
DE 202012001919 U 3/2012
JP 200645119 A 2/2006

OTHER PUBLICATIONS

English abstract of DE19652298.
English abstract of DE202012001919.

* cited by examiner

DEVICE AND METHOD FOR CUTTING A GOOD TO BE CUT BY MEANS OF A FLUID

CROSS REFERENCE TO RELATED APPLICATIONS

This application is a U.S. National Stage Entry of International Patent Application Serial Number PCT/EP2016/051351, filed Jan. 22, 2016, which claims priority to German Patent Application No. DE 10 2015 104 245.2 filed Mar. 20, 2015, the entire contents of both of which are incorporated herein by reference.

FIELD

The present disclosure generally relates to devices and methods for cutting objects, including devices and methods for cutting objects with the aid of a fluid.

BACKGROUND

Water-jet cutting devices are well known from the prior art. Water is placed under a high pressure of up to 7,000 bar by means of the pressure-generating unit and is conveyed through an outlet nozzle. In the outlet nozzle, the water accelerates to high speeds such that a water jet, with which the cuttable material is impinged upon for the purpose of cutting said material, is formed. Optionally, an abrasive material, such as for example fine garnet sand, is admixed with the water jet. It is known that water-jet cutting affords a number of technical advantages over other cutting methods, such as laser cutting or sawing, such as for example cutting without introduction of heat so that there is no risk of distortion in the cuttable material. Moreover, a particularly important advantage of water-jet cutting is that the water jet itself can make, in the cuttable material, its initial bore from which the cuttable material is cut. The making of this initial opening is also referred to as 'piercing' of the cuttable material.

Water-jet cutting can in principle be used for cutting nearly all common materials. A special feature arises, however, when cutting cuttable material made of glass, glass-fiber-reinforced plastic and carbon-fiber-reinforced plastic. In the case of such cuttable material, the piercing operation for making the initial opening is performed at a lower pressure in comparison with the subsequent cutting operation, since otherwise there is a danger of damaging the cuttable material, in particular of cracking or breaking the cuttable material in the region of the initial opening. For this reason, use is typically made of controllable pressure-generating units which are able to provide at least two different types of output pressures, a low pressure for piercing and a high pressure for cutting the cuttable material. The water pressure generated by the pressure-generating unit is typically subject to a pulsation, that is to say to a small temporal fluctuation. In order to produce as clean a cut as possible, this pulsation is normally damped using a pulsation damper or buffer volume firmly incorporated into the fluid line. However, said pulsation damper disadvantageously leads to a relatively long duration for the switching of the device between the low pressure for piercing and the high pressure for cutting.

DETAILED DESCRIPTION

Figure 1:
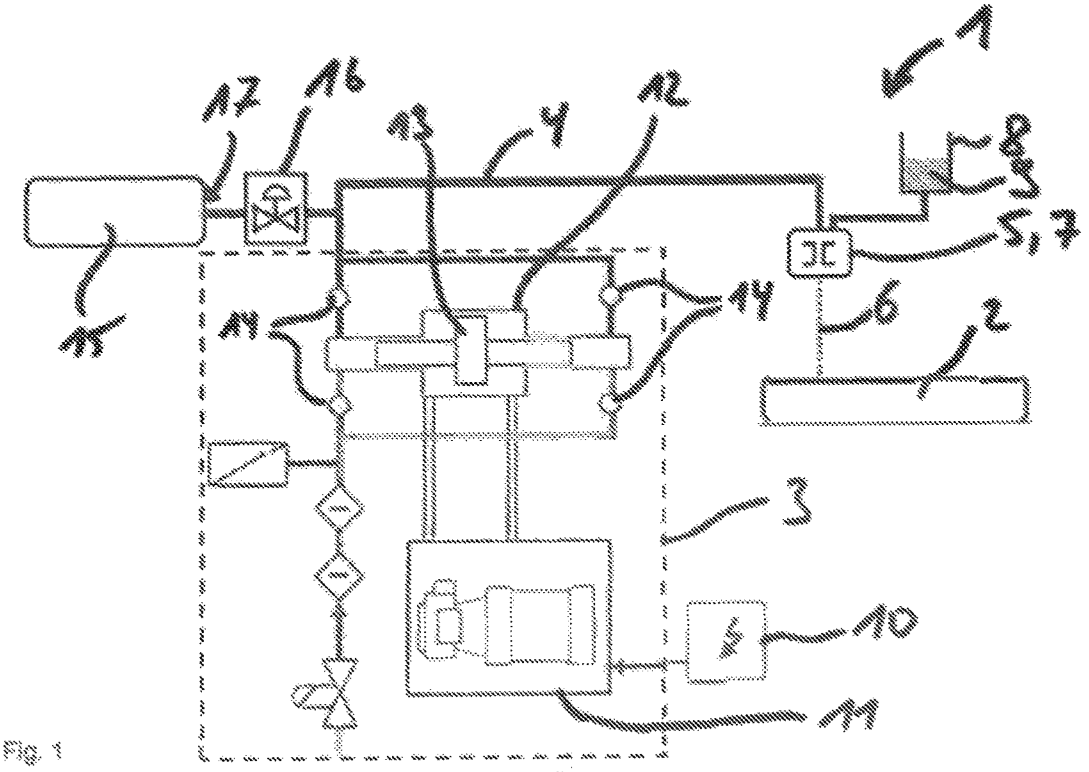
FIG. 1 is a diagrammatic view of an example device and an example method according to an exemplary first embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Further details, features and advantages of the present disclosure emerge from the drawings, and also from the following description of preferred embodiments on the basis of the drawings. The drawings thereby merely illustrate exemplary embodiments of the present disclosure and do not restrict the scope of the present disclosure. In the various figures, the same parts are provided with the same designations, and are therefore in each case also generally only referred to or mentioned once.

The present disclosure is generally concerned with devices for cutting a cuttable material with the aid of a fluid, in particular for water-jet cutting. In some examples, a device may comprise a pressure-generating unit and an outlet nozzle fluidically connected to the pressure-generating unit via a fluid line. The pressure-generating unit may be provided for pressurizing the fluid in the fluid line. Further, the device may also comprise a pulsation damper for damping pressure fluctuations in the fluid line.

It is therefore an object of the present invention to provide a device and a method for cutting cuttable material with the aid of a fluid, in which device and method significantly quicker switching between piercing and cutting is made possible. Furthermore, the device and the method should be realizable in a relatively simple, low-cost, durable and efficient manner.

The example object of the present disclosure set forth above is achieved by a device for cutting a cuttable material with the aid of a fluid, in particular for water-jet cutting, wherein the device comprises a pressure-generating unit and an outlet nozzle fluidically connected to the pressure-generating unit via a fluid line, wherein the pressure-generating unit is provided for pressurizing the fluid in the fluid line, and wherein the device also comprises a pulsation damper for damping pressure fluctuations in the fluid line, and wherein further the device comprises at least one switching valve such that, depending on the switching position of the switching valve, the pulsation damper is couplable to the fluid line and uncouplable from the fluid line.

In comparison with the prior art, the device according to the invention has the advantage that quick switching between different pressures is made possible, and so, in particular, a quick changeover between piercing and cutting of cuttable material made of glass, glass-fiber-reinforced plastic and carbon-fiber-reinforced plastic is realizable. This allows, for example, a multiplicity of separate workpieces to be cut out of a plate-shaped cuttable material significantly more quickly. The acceleration of the changeover between piercing and cutting is achieved by virtue of the fact that the pulsation damper is not firmly incorporated into the fluid line as in the prior art, but can be optionally or temporarily uncoupled from the fluid line via the switching valve. If, for example, a cut in the cuttable material, which is performed at a high working pressure, has been finished and the cuttable material is to be "pierced" at a new position, the pulsation damper is uncoupled from the fluid line and the pressure-generating unit is switched down or brought down in a regulated manner to the lower working pressure. The fluid line subsequently expands via the open outlet nozzle and the lower working pressure is present in the fluid line almost immediately. In particular, it is not necessary to firstly wait for the complete reduction in pressure in the pulsation damper. Conversely, for example if, following the piercing of the cuttable material at a low working pressure, there is to be a changeover to a high working pressure for the purpose of cutting the cuttable material from the pierced position, the pressure-generating unit is switched up or brought up in a regulated manner to the high working pressure and the pulsation damper is connected. In this way, the high working pressure is present very quickly and it is not necessary to firstly wait for the slowly progressive build-up of pressure in the pulsation damper. The device according to the invention consequently allows quicker switching between different pressures. At the same time, clean cutting of cuttable material is made possible in a known way, since the device nevertheless comprises a pulsation damper for damping the pressure pulsation in the fluid line. A further advantage is that the pulsation damper is not constantly pressurized with different working pressures and thus is subjected to significantly fewer load cycles, whereby the lifetime of the pulsation damper is lengthened considerably. In the context of the present invention, the fluid comprises in particular water. The cuttable material preferably comprises glass, glass-fiber-reinforced plastic, carbon-fiber-reinforced plastic, ceramic, natural stone, and other materials with a similar behavior. The pulsation damper is also referred to as a buffer volume and typically has a volume of 2 to 5 liters.

Advantageous configurations and refinements of the invention can be found in the subclaims and also in the description with reference to the drawings.

According to a preferred embodiment of the present invention, it is provided that the pressure-generating unit is a pressure-generating unit with a controllable output pressure which is operable at least in a first operating mode at a first working pressure and in a second operating mode at a second working pressure, where the first working pressure is larger than the second working pressure. Preferably, the device is switchable between a first operating mode intended for the cutting of the cuttable material, in which mode the pressure-generating unit provides the first working pressure and the pulsation damper is coupled to the fluid line by means of the switching valve, and a second operating mode intended for the initial perforation of the cuttable material (also referred to as "piercing"), in which mode the pressure-generating unit provides the second working pressure and the pulsation damper is uncoupled from the fluid line by means of the switching valve. Entirely surprisingly and unforeseeably, it has been found that the piercing of cuttable material, such as for example glass, glass-fiber-reinforced plastic and carbon-fiber-reinforced plastic, at the lower working pressure can also be performed successfully if, in this second operating mode, no pulsation damper at all is incorporated into the fluid line or the at least one pulsation damper is uncoupled from the fluid line by means of the at least one switching valve. The pressure fluctuations in the fluid line, which consequently inevitably occur during the second operating mode, can be tolerated accordingly in order to shorten the switching time between the first and second operating mode. It has been found that, in this way, switching times of approximately 1 second and less can be achieved. The first working pressure preferably involves a pressure between 2,000 and 6,000 bar, particularly preferably between 3,000 and 4,000 bar, while the second working pressure preferably involves a pressure between 400 and 900 bar, particularly preferably between 600 and 800 bar.

According to a further preferred embodiment of the present invention, it is provided that the pressure-generating unit comprises a pressure booster and/or a high-pressure pump, in particular a hydraulically-driven high-pressure pump, an electromechanically-driven high-pressure pump or a high-pressure pump with a crank drive. The pressure-generating unit preferably comprises a hydraulic unit which drives a dual-acting pressure booster which runs in oscillating operation, in order to convert the pressure generated by a forepump to a high pressure of 2,000 to 6,000 bar or 400 to 900 bar. The pressure fluctuations in the fluid line, which arise due to the oscillating operation of the pressure booster, are, at least in the first operating mode, damped or compensated by the pulsation damper. For this purpose, the pulsation damper comprises in particular a pressure accumulation chamber.

According to a further preferred embodiment of the present invention, it is provided that the device comprises a switchable expansion valve which, on the input side, is fluidically connected to the fluid line and, on the output side, is in particular at ambient pressure. Optionally, when switching the device from the first operating mode (cutting) to the second operating mode (piercing), it is possible not only for the pressure-generating unit to be correspondingly brought down in a controlled manner and the pulsation damper to be uncoupled from the fluid line, but additionally also for the expansion valve to be opened briefly. The opening of the expansion valve ensures that the pressure in the fluid line drops from the first working pressure to the second working pressure even more quickly. The switching time can thereby be reduced, for example, to 0.3 seconds. The emergency valve, for example, which is provided in high-pressure installations anyway, can be used or correspondingly switched as the expansion valve.

According to a further preferred embodiment of the present invention, it is provided that the device comprises a mixing chamber for admixing abrasive material with the fluid, wherein the mixing chamber is arranged downstream of the outlet nozzle along the main flow direction of the fluid, and wherein the mixing chamber is connected to a reservoir for abrasive material. The outlet nozzle acts as a venturi nozzle, whereby the abrasive material is sucked into the water jet automatically due to negative pressure. In comparison with pure water cutting, the admixture of abrasive materials, such as quartz sand, corundum, garnet or the like, has the advantage that the cutting power is increased, and thus relatively hard materials can be cut.

According to a further preferred embodiment of the present invention, it is provided that the pulsation damper comprises a closed pressure accumulation chamber which comprises only a single access opening, wherein the one access opening is connected to the fluid line via the switching valve. Therefore, in an advantageous manner, only a single switching valve is required for the coupling and uncoupling of the pulsation damper. The minimization of the number of required switching valves that is consequently achieved makes the device low-cost, easy to maintain and durable, since the switching valves incorporated into the high-pressure circuit are subjected to relatively high wear. The expression "a single access opening" in the context of the present invention means, in particular, that only a single opening, which is not permanently closed and which is fluidically connected to the fluid line, is provided.

According to an alternative embodiment of the present invention, it is provided that the pulsation damper comprises a closed pressure accumulation chamber, connectable in parallel with the fluid line, with two access openings, wherein the one access opening is, via the one switching valve, couplable to the fluid line and uncouplable from the fluid line, and wherein the other access opening is, via a further switching valve, couplable to the fluid line and uncouplable from the fluid line. In this embodiment, the fluid advantageously flows through the pulsation damper, and so a better damping effect can be achieved.

According to a further preferred embodiment of the present invention, it is provided that the device comprises a further pulsation damper which is, via at least one further switching valve, couplable to the fluid line and uncouplable from the fluid line. It is conceivable that, in the second operating mode, the further pulsation damper is coupled (in particular exclusively) to the fluid line. In this way, it is possible for the pressure fluctuations, which, in the second operating mode, can no longer be compensated for by the uncoupled pulsation damper, to be damped by the further pulsation damper. It is conceivable that the pulsation dampers are different in size.

The present invention also relates to a method for cutting a cuttable material with the aid of a fluid, in particular for water-jet cutting, wherein a fluid is pressurized by means of a pressure-generating unit, wherein the pressurized fluid is guided through a fluid line to an outlet nozzle, and wherein the cuttable material is impinged upon by the fluid exiting the outlet nozzle, characterized in that the method is optionally executed in a first operating mode, in which a pulsation damper is coupled to the fluid line by means of a switching valve, and a second operating mode, in which the pulsation damper is uncoupled from the fluid line by means of the switching valve.

Analogously to the device according to the invention already discussed above, in comparison with the prior art, the method according to the invention also allows a significantly quicker changeover between the first and the second operating mode, since, in the second operating mode, the pulsation damper is uncoupled from the fluid line. In this way, in particular switching between cutting and piercing during the processing of glass, glass-fiber-reinforced plastic and carbon-fiber-reinforced plastic is accelerated. Preferably, the second operating mode is used for the initial perforation of the cuttable material, while the first operating mode is used for the subsequent cutting of the cuttable material. A further advantage is that the pulsation damper is not constantly pressurized with different working pressures and thus is subjected to significantly fewer load cycles, whereby the lifetime of the pulsation damper is lengthened considerably.

According to a preferred embodiment of the present invention, it is provided that, in the first operating mode, a first working pressure is provided by the pressure-generating unit and, in the second operating mode, a second working pressure is provided by the pressure-generating unit, where the first working pressure is larger than the second working pressure. Advantageously, during the use of the lower, second working pressure, piercing of materials such as glass, glass-fiber-reinforced plastic and carbon-fiber-reinforced plastic is made possible without the risk of cracking or breaking these materials. The first working pressure preferably involves a pressure between 2,000 and 6,000 bar, particularly preferably between 3,000 and 4,000 bar, while the second working pressure preferably involves a pressure between 400 and 900 bar, particularly preferably between 600 and 800 bar.

According to a preferred embodiment of the present invention, it is provided that, when changing from the first operating mode to the second operating mode, the switching valve is closed, and wherein, when changing from the second operating mode to the first operating mode, the switching valve is opened. If, for example, a cut in the cuttable material, which is performed at the high, first working pressure, has been finished and the cuttable material is to be "pierced" at a new position, the pulsation damper is uncoupled from the fluid line and the pressure-generating unit is switched down or brought down in a regulated manner to the lower, second working pressure. Due to the open outlet nozzle, the fluid line is expanded and the lower, second working pressure is then immediately present in the fluid line. Conversely, for example if, following the piercing of the cuttable material at the low, second working pressure, there is to be a changeover to the high, first working pressure for the purpose of cutting the cuttable material from the pierced position, the pressure-generating unit is switched up to the high, first working pressure and the pulsation damper is connected. In this way, the high working pressure is present very quickly and it is not necessary to firstly wait for the slowly progressive build-up of pressure in the pulsation damper. It has been found that, in this way, switching times of approximately 1 second and less can be achieved.

According to a preferred embodiment of the present invention, it is provided that, when changing from the first operating mode to the second operating mode, firstly the switching valve is closed and subsequently the pressure-generating unit is controlled such that the pressure in the fluid line drops from the first working pressure to the second working pressure, and/or wherein, when changing from the second operating mode to the first operating mode, firstly the pressure-generating unit is controlled such that the pressure in the fluid line rises from the second working pressure to the first working pressure and subsequently the switching valve is opened. The time-offset control of the pressure-generating unit and switching of the switching valve ensures that the pressure difference at the switching valve is kept relatively small at all times. As a result, the wear at the switching valve is advantageously counteracted, and the durability and the ease of maintenance of the device are increased considerably.

According to a preferred embodiment of the present invention, it is provided that, when changing from the first operating mode to the second operating mode, an expansion valve fluidically connected to the fluid line is at least temporarily opened. Optionally, when switching the device from the first operating mode (cutting) to the second operating mode (piercing), it is possible not only for the pressure-generating unit to be correspondingly switched down and the pulsation damper to be uncoupled from the fluid line, but additionally also for the expansion valve to be opened briefly. The opening of the expansion valve ensures that the pressure in the fluid line drops from the first working pressure to the second working pressure even more quickly. The switching time can thereby be reduced, for example, to 0.3 seconds. The emergency valve, for example, which is provided in high-pressure installations anyway, can be used or correspondingly switched as the expansion valve.

According to an alternative embodiment of the present invention, it is provided that, by means of a further switching valve, switching is realized between a first operating mode, in which a pulsation damper is coupled to the fluid line, and a second operating mode, in which the pulsation damper is uncoupled from the fluid line. In this embodiment, the pulsation damper comprises two access openings, wherein a switching valve has to be switched for each access opening in order to couple or uncouple the pulsation damper.

According to a further alternative embodiment of the present invention, the device comprises a further pulsation damper which is connected to the fluid line in the second operating mode by means of a further switching valve. It is conceivable that the further pulsation damper dampens the pressure in the fluid line at the lower, second working pressure at all times. The further pulsation damper is therefore preferably connected to the fluid line only in the second operating mode. Thus, only the lower, second working pressure generally prevails in the further pulsation damper, while only the higher, first working pressure generally prevails in the pulsation damper. Depending on the operating mode, the pulsation damper or the further pulsation damper is then connected.

Preferably, the device comprises a cutting valve downstream of the outlet nozzle. When switching from the first operating mode to the second operating mode, the cutting valve is in particular kept open, in order that a reduction in pressure in the fluid line can take place by way of the cutting valve.

For a person skilled in the art, it goes without saying that not only water or water mixed with abrasive material, but also other fluids, such as for example liquid ammonia, can be used as the fluid for cutting the cuttable material.

The switching valve and/or the further switching valve preferably comprises an electromotively actuated valve, an electromagnetically actuated valve, a pneumatically actuated valve, or a hydraulically actuated valve.

FIG. 1 shows a diagrammatic view of a device 1 and of a method for cutting a cuttable material 2 with the aid of a fluid according to an exemplary first embodiment of the present invention.

The device 1 comprises a pressure-generating unit 3 with which water is pressurized. The pressurized water is guided to an outlet nozzle 5 by means of a fluid line 4. In the outlet nozzle 5, the water is highly accelerated due to the large pressure difference between the pressure in the interior of the fluid line 4 and the ambient pressure, and forms a water jet 6. Immediately downstream of the outlet nozzle 5, there is also formed a mixing chamber 7 in which the water is mixed with an abrasive material 9, here in the form of a fine-grained quartz sand. For this purpose, the mixing chamber 7 is connected to a reservoir 8 in which the abrasive material 9 is held. As a result of the venturi effect in the region of the outlet nozzle 5, the abrasive material 9 is automatically drawn into the water jet 6 due to negative pressure. The water jet 6, mixed with abrasive material 9, then strikes the cuttable material 2 that is to be cut. In the present example, the cuttable material 2 comprises a glass.

An advantage of water-jet cutting is that the water jet 6 itself can make, in the cuttable material 2, its initial bore from which the cuttable material 2 is cut. The making of this initial opening is also referred to as "piercing" of the cuttable material 2. When cutting glass, however, the problem arises that the glass shatters during the piercing of the glass at full working pressure. A lower working pressure must therefore be used when piercing the glass than when cutting the glass.

For this purpose, the device 1 is formed such that, and is controlled by control electronics 10 such that, the device 1 is optionally operated in a first operating mode, which is intended for the cutting of the cuttable material 2, and in a second operating mode, which is intended for the piercing of the cuttable material 2. In the first operating mode, the pressure-generating unit 3 is regulated such that a high, first working pressure between 3,000 and 4,000 bar is generated in the fluid line 4, while in the second operating mode, the pressure-generating unit 3 is regulated such that a lower, second working pressure between 600 and 800 bar is generated in the fluid line 4.

Downstream of the outlet nozzle 5, the device 1 comprises has in particular a cutting valve. The water jet 6 exits through the open cutting valve, while the water jet 6 is interrupted when closing the cutting valve. In this way, a safety shutdown can take place, for example.

In the present example, the pressure-generating unit comprises a hydraulic unit 11 which drives a dual-acting pressure booster 12. The dual-acting pressure booster 12 comprises, in a known way, a piston 13 which runs in oscillating operation, and to convert a pressure generated in the water by a forepump (not shown) to the first or second working pressure, depending on the operating mode, by means of check valves 14.

The oscillating operation of the piston 13 gives rise to unwanted pressure pulsations in the fluid line 4. For damping these pressure pulsations, the device 1 comprises a pulsation damper 15 (also referred to as a buffer volume). For this purpose, the pulsation damper 15 comprises a pressure accumulation chamber.

In the device 1 according to the invention, the pulsation damper 15 is connected to the fluid line 4 via a switching valve 16. Therefore, depending on the position of the switching valve 16, the pulsation damper 15 is coupled to the fluid line 4 (switching valve 16 is open) or uncoupled from the fluid line 4 (switching valve 16 is closed). The switching valve 16 preferably comprises an electromotively actuated valve, an electromagnetically actuated valve, a pneumatically actuated valve, or a hydraulically actuated valve, which is switched by the control electronics 10 during the changeover between the first and second operating mode. The pulsation damper 15 comprises only a single access opening 17, via which the interior of the pulsation damper 15 is fluidically connected to the fluid line 5 via the switching valve 16 (in the case of an open switching valve 16 only).

If the cuttable material 2 is cut, the device 1 is operated in the first operating mode, and in this case, the pressure-generating unit 3 provides the first working pressure in the fluid line 4. Furthermore, the switching valve 16 is open, and so the pressure pulsations in the fluid line 4 are damped by the pulsation damper 15. Thus, the first working pressure also prevails on average in the pulsation damper 15. If a new cut is then to be made at a new position on the cuttable material 2, for the purpose of applying the water jet 6, the cuttable material 2 must firstly be pierced at this new position. The device 1 must therefore change over from the first operating mode to the second operating mode such that the first working pressure is reduced to the second working pressure and the cuttable material 2 is not destroyed during the piercing operation.

When switching from the first operating mode to the second operating mode, firstly the switching valve 16 is closed by way of the control electronics 10. The first working pressure is consequently stored in the pulsation damper 15. Afterwards, the pressure-generating unit 3 is brought down in a controlled or regulated manner by the control electronics 10 such that an expansion takes place via the cutting valve and, in the fluid line 4, the first working pressure is no longer provided, but instead the lower, second working pressure is provided. Due to the uncoupling of the pulsation damper 15 beforehand, the pressure of the fluid line 4 drops to the second working pressure relatively quickly, since it is not necessary to also wait for a drop in the pressure in the pulsation damper 15 or the pressure in the pulsation damper 15 firstly counteracts the drop in pressure and the volume of the fluid line 4 is relatively small in comparison with the volume of the pulsation damper 15. In the exemplary device 1, the changeover from the first operating state to the second operating state consequently lasts less than one second. During the second operating mode, the cuttable material 2 can then be pierced. However, in this second operating mode, there is no pulsation damper 15 available for damping pressure fluctuations. It has, however, been found that this situation is not critical for the piercing operation.

In case an even quicker changeover from the first operating state to the second operating state is desired, the emergency valve (not shown), which acts as an expansion valve and is provided in any high-pressure circuit anyway, can optionally be briefly opened by way of the control electronics 10 (only after the switching valve 16 has been closed), in order to accelerate the drop in pressure in the fluid line 4.

If the piercing operation has then been carried out and the cuttable material 2 is to be cut starting from the initial opening made during the piercing operation, there is a changeover from the second operating mode back to the first operating mode. Here, firstly the pressure-generating unit 3 is controlled or regulated by the control electronics 10 such that the pressure in the fluid line 4 increases from the second working pressure to the first working pressure. Subsequently the switching valve 16 is opened. This switching operation takes place significantly more quickly than in the case of the prior art, since the increased first working pressure already prevails in the pulsation damper 15 and does not need to be firstly built up anew by the pressure-generating unit 3. The cuttable material 2 can then be cut, and pressure fluctuations in the fluid line 4 are damped by the pulsation damper 15 in the usual manner.

In the case of the above-mentioned switching of the switching valve 16, the switching valve 16 is always only switched if nearly the first working pressure prevails on both sides of the switching valve 16. Advantageously, the switching valve 16 is consequently subject to only relatively low wear. Furthermore, the pulsation damper 15 is excluded from large pressure fluctuations between the first and second working pressure, since the first working pressure substantially prevails at all times in the pulsation damper 15. The pulsation damper 15 of the present device 1 is accordingly not subjected to any major load cycles and therefore has a significantly longer lifetime.

The device 1 preferably comprises a pressure measurement device which either measures the pressure inside the fluid line directly via a sensor in the fluid line 4, or determines the pressure in the fluid line 4 indirectly, for example via the position of the hydraulic unit 11. It is also conceivable that the pressure in the pulsation damper 15 is monitored.

Figure 2:
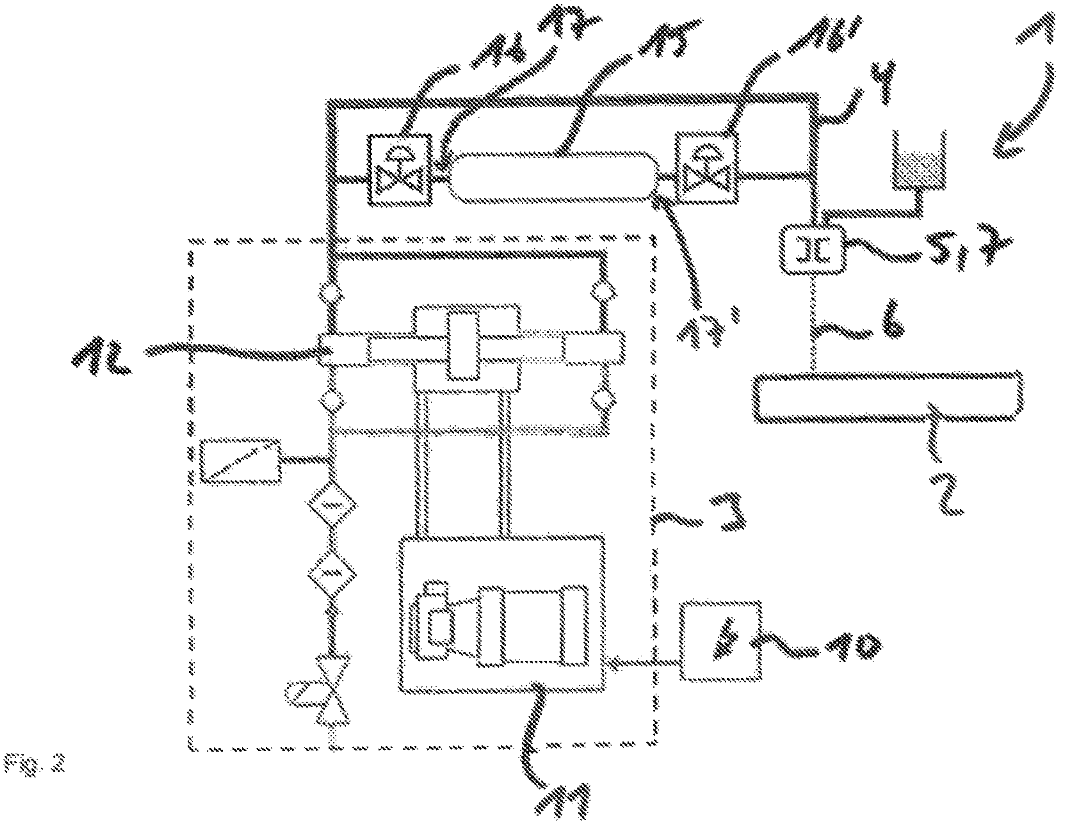
FIG. 2 is a diagrammatic view of an example device and an example method according to an exemplary second embodiment.

FIG. 2 shows a diagrammatic view of a device 1 and of a method for cutting a cuttable material 2 with the aid of a fluid according to an exemplary second embodiment of the present invention. The second embodiment is almost identical to the first embodiment described in FIG. 1, wherein, in the second embodiment, the only difference from the first embodiment is that the pulsation damper 15 is provided with two access openings 17 and is accordingly couplable to the fluid line 4 via two switching valves, a switching valve 16 and a further switching valve 16'. In the first operating state, both switching valves 16, 16' are open, while in the second operating state, both switching valves 16, 16' are closed. If both switching valves 16, 16', are closed the fluid line 4 acts as a bypass with respect to the pulsation damper 15. The only difference with respect to the functioning of the device 1 illustrated in FIG. 1, in the device 1 illustrated in FIG. 2, both switching valves 16, 16' have to be controlled by the control electronics 10 at all times.

Figure 3:
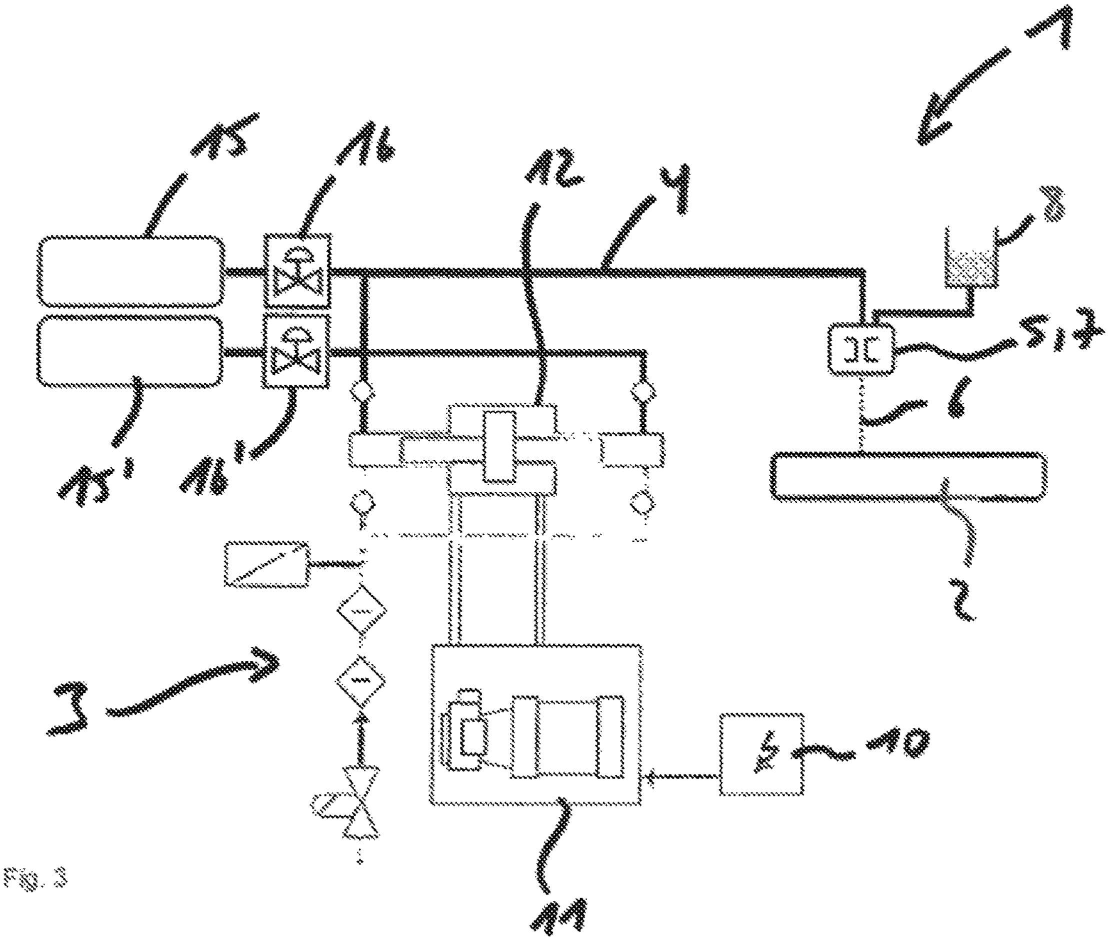
FIG. 3 is a diagrammatic view of an example device and an example method according to an exemplary third embodiment.

FIG. 3 shows a diagrammatic view of a device 1 and of a method for cutting a cuttable material 2 with the aid of a fluid according to an exemplary third embodiment of the present invention. Again, the third embodiment is almost identical to the first embodiment described in FIG. 1, wherein, in the third embodiment, a difference from the first embodiment is that there additionally provided a separate further pulsation damper 15' which is, via a separate further switching valve 16', couplable to the fluid line 4 or uncouplable from the fluid line 4. The device 1 illustrated in FIG. 3 works exactly as the device 1 illustrated in FIG. 1, wherein, only in the second operating mode, the further pulsation damper 15' is connected to the fluid line 4 by means of the further switching valve 16' as soon as the lower, second working pressure prevails in the fluid line, otherwise (in particular in the first operating mode) the further switching valve 16' is closed. In the further pulsation damper 15', the second working pressure therefore likewise prevails at all times, and thus, on the one hand, quick switching between the first and second operating mode is ensured and, on the other hand, damping of pressure pulsations in the fluid line 4 are damped by means of the further pulsation damper 15', even in the second operating mode. Before the changeover from the second operating mode to the first operating mode, the further switching valve 16' is closed by the control electronics 10 again. Consequently, the further switching valve 16' too is subject only to low wear.

What is claimed is:

1. A device for cutting a cuttable material with the aid of a fluid, the device comprising:

an outlet nozzle;

a pressure-generating unit, wherein the outlet nozzle is fluidically connected to the pressure-generating unit via a fluid line, wherein the pressure-generating unit pressurizes the fluid in the fluid line;

a switching valve; and a pulsation damper for damping pressure fluctuations from the fluid line, wherein depending on a switching position of the switching valve the pulsation damper is couplable to the fluid line and uncouplable from the fluid line.

2. The device of claim 1 wherein the pressure-generating unit has a controllable output pressure that is operable at least in a first operating mode at a first working pressure and in a second operating mode at a second working pressure, wherein the first working pressure is larger than the second working pressure.

3. The device of claim 1 wherein the device is switchable between a first operating mode for cutting the cuttable material, wherein in the first operating mode the pressure-generating unit provides a first working pressure and the pulsation damper is coupled to the fluid line by the switching valve; and a second operating mode for an initial perforation of the cuttable material, wherein in the second operating mode the pressure-generating unit provides a second working pressure and the pulsation damper is uncoupled from the fluid line by way of the switching valve, wherein the first working pressure is larger than the second working pressure.

4. The device of claim 1 wherein the pressure-generating unit comprises a pressure booster and/or a hydraulically-driven high-pressure pump, an electromechanically-driven high-pressure pump, or a high-pressure pump with a crank drive.

5. The device of claim 1 further comprising a switchable expansion valve, wherein an input side of the switchable expansion valve is fluidically connected to the fluid line and an output side of the switchable expansion valve is at ambient pressure.

6. The device of claim 1 further comprising a mixing chamber for admixing abrasive material with the fluid, wherein the mixing chamber is disposed downstream of the outlet nozzle along a main flow direction of the fluid, wherein the mixing chamber is connected to a reservoir for abrasive material.

7. The device of claim 1 wherein the pulsation damper comprises a closed pressure accumulation chamber that includes only a single access opening, where the single access opening is connected to the fluid line via the switching valve.

8. The device of claim 1 wherein the switching valve is a first switching valve, wherein the pulsation damper comprises a closed pressure accumulation chamber that is connectable in parallel with the fluid line and includes a first access opening and a second access opening, wherein the first access opening is couplable via the first switching valve to the fluid line and uncouplable from the fluid line, wherein the second access opening is couplable via a second switching valve to the fluid line and uncouplable from the fluid line.

9. The device of claim 1 wherein the pulsation damper is a first pulsation damper and the switching valve is a first switching valve, the device further comprising a second pulsation damper that is couplable via a second switching valve to the fluid line and uncouplable from the fluid line.

10. A method for cutting a cuttable material with the aid of a fluid, the method comprising:

pressurizing the fluid with a pressure-generating unit;

guiding the fluid through a fluid line to an outlet nozzle;

impinging the cuttable material with the fluid exiting the outlet nozzle; and coupling/uncoupling a pulsation damper to/from the fluid line by way of a switching valve, wherein in a first operating mode the pulsation damper is coupled to the fluid line by way of the switching valve and in a second operating mode the pulsation damper is uncoupled from the fluid line by way of the switching valve.

11. The method of claim 10 further comprising:

generating a first working pressure with the pressure-generating unit in the first operating mode; and generating a second working pressure with the pressure-generating unit in the second operating mode, with the first working pressure being larger than the second working pressure.

12. The method of claim 10 further comprising:

closing the switching valve when changing from the first operating mode to the second operating mode; and opening the switching valve when changing from the second operating mode to the first operating mode.

13. The method of claim 12 further comprising controlling the pres sure-generating unit such that a pressure in the fluid line drops from a first working pressure to a second working pressure after closing the switching valve when changing from the first operating mode to the second operating mode.

14. The method of claim 13 further comprising controlling the pres sure-generating unit such that the pressure in the fluid line rises from the second working pressure to the first working pressure before opening the switching valve when changing from the second operating mode to the first operating mode.

15. The method of claim 12 further comprising controlling the pres sure-generating unit such that a pressure in the fluid line rises from a second working pressure to a first working pressure before opening the switching valve when changing from the second operating mode to the first operating mode.

16. The method of claim 10 further comprising at least temporarily opening an expansion valve that is fluidically connected to the fluid line when changing from the first operating mode to the second operating mode.

17. The method of claim 10 wherein the second operating mode is used to initially perforate the cuttable material and the first operating mode is used to subsequently cut the cuttable material.

* * * * *